E. W. QUICK.
NUT LOCK.
APPLICATION FILED MAR. 4, 1916.

1,227,310. Patented May 22, 1917.

Witnesses

Inventor
E. W. Quick.
By
Attorney

UNITED STATES PATENT OFFICE.

ELONZY W. QUICK, OF CENTRALIA, FLORIDA.

NUT-LOCK.

1,227,310.  Specification of Letters Patent.  Patented May 22, 1917.

Application filed March 4, 1916. Serial No. 82,165.

*To all whom it may concern:*

Be it known that I, ELONZY W. QUICK, a citizen of the United States, residing at Centralia, in the county of Hernando and State of Florida, have invented certain new and useful Improvements in Nut-Locks; and I do hereby declare the following to be a full, clear, and exact description of the invention, such as will enable others skilled in the art to which it appertains to make and use the same.

This invention has for its primary object to provide simple and effective means for rigidly locking a nut against rotational movement in one direction upon a bolt.

Another object is the provision of means for deflecting the locking elements outwardly as the bolt is entered in the nut so as to permit the latter being readily threaded upon the bolt.

Figure 1:
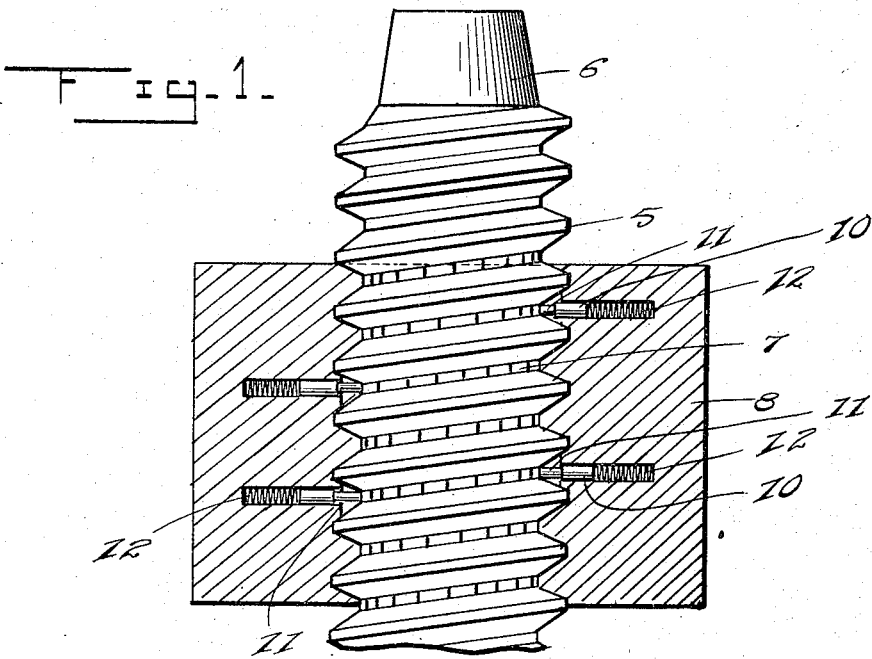
Figure 2:
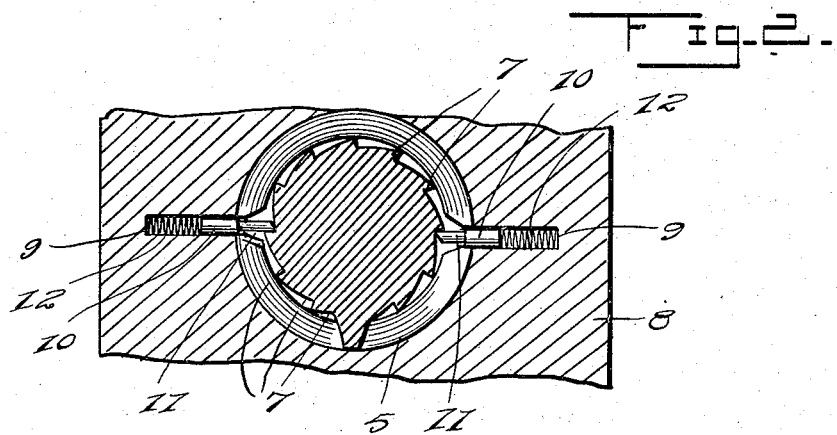
Figure 3:
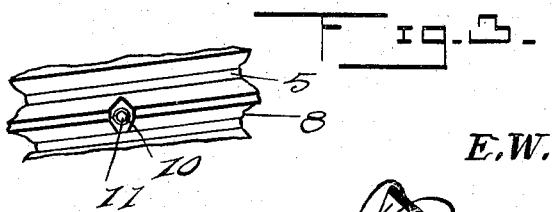

With these and other objects in view, the invention consists in the novel construction, combination and arrangement of parts as will be hereinafter specifically described, claimed and illustrated in the accompanying drawing, in which:

Figure 1 represents a sectional view through the nut, illustrating the bolt in side elevation, Fig. 2 represents a transverse sectional view through the bolt and nut, and Fig. 3 represents a fragmentary exterior view of the bore of the nut, illustrating one of the locking elements in end elevation.

Referring to the drawing in detail, wherein similar reference numerals designate corresponding parts throughout the several views, the numeral 5 indicates a bolt, having the usual external screw threads and a preferred type of head, not shown, at one end thereof. The opposite end of the bolt is provided with a frusto-conical extension 6, having the relatively small end directed outwardly, for a purpose which will hereinafter appear.

From a point adjacent the inner extremity of the reduced portion 6, the groove defined by the screw threads 5 of the bolt is formed with a plurality of substantially V-shaped recesses providing a plurality of radially projecting ratchet teeth 7.

A nut 8 having an internally screw threaded bore 8ª is fitted upon the bolt 5 and is formed with pairs of diametrically opposed radial recesses 9. As clearly illustrated in Fig. 2, the recesses 9 of each pair are arranged in spaced relation to each other and in staggered relation to the recesses of the other pair and in such position as to register with the ratchet teeth 7. Springs 12 are arranged in the outer extremities of the recesses 9 and are engaged with pins 10, which latter are provided with beveled inner ends whereby the pins are normally retained in inwardly extended position and in engagement with the ratchet teeth 7. The pins 10 are polygonal in cross section and the recesses are of a corresponding shape, so as to secure the pins against rotation in the recesses and retain the beveled terminals in proper position for engagement with the ratchet teeth 7.

In use, the tapered extremity 6 of the bolt is inserted in the bore of the nut 8, engaging and moving the reduced inner ends 11 of the pins 10 outwardly. The nut is then threaded upon the bolt in the usual manner, the pins riding over the inclined surfaces of the ratchet teeth 7. After the nut has been advanced to the desired position upon the bolt it is evident that the nut is permanently locked against rotational movement in the opposite direction by the reduced ends 11 of the locking pins engaging the radial faces of the ratchet teeth 7.

What I claim is:

1. A nut lock including a bolt having external screw threads, ratchet teeth formed in the groove defined by the screw threads of the bolt, a nut fitted upon said bolt, spring pressed pins slidably mounted in the nut adapted to engage said ratchet teeth to lock the nut against rotational movement in one direction with relation to the bolt, and a reduced frusto-conical extension carried by the end of the bolt adapted, during its insertion in the bed, to deflect the pins.

2. A nut lock including a bolt having external screw threads, ratchet teeth formed in the groove defined by the screw threads of the bolt, a nut having an internally screw threaded bore, receiving said bolt, and pairs of diametrically opposed recesses formed in the wall of the bore, the recesses of one pair being arranged in staggered relation to the recesses of the other pair, and spring pressed pins arranged in said recesses and adapted to engage the ratchet teeth to lock the nut against rotational movement in one direction with relation to the bolt.

3. A nut lock including a bolt having external screw threads, ratchet teeth formed in the groove defined by said screw threads of the bolt, a nut having an internally screw threaded bore receiving said bolt and having pairs of diametrically opposed recesses in the wall of the bore thereof, the recesses of one pair being arranged in staggered relation to the recesses of the other pair, spring actuated locking pins slidably mounted in said recesses, and a reduced frusto-conical extension carried by one end of the bolt adapted, during insertion of the bolt within the nut, to deflect the pins outwardly to facilitate application of the nut to the bolt.

4. A nut lock including a bolt having external screw threads, ratchet teeth formed in the groove defined by the screw threads, a nut having an internally screw threaded bore receiving said bolt and provided with internal polygonal recesses, heads non-rotatably fitted in said recesses, pins carried by said heads having beveled inner terminals engaging the ratchet teeth of the bolt, and means normally retaining the beveled terminals of the pins in engagement with the ratchet teeth to prevent rotary movement of the bolt in one direction with relation to the nut.

In testimony whereof I affix my signature in presence of two witnesses.

ELONZY <sup>his</sup> X <sub>mark</sub> W. QUICK.

Witnesses:
R. M. STEWART,
R. H. WEAVER.

Copies of this patent may be obtained for five cents each, by addressing the "Commissioner of Patents. Washington, D. C."